July 18, 1939. M. P. LAURENT 2,166,304
VALVE-OPERATING MECHANISM
Filed Oct. 20, 1936 2 Sheets-Sheet 2

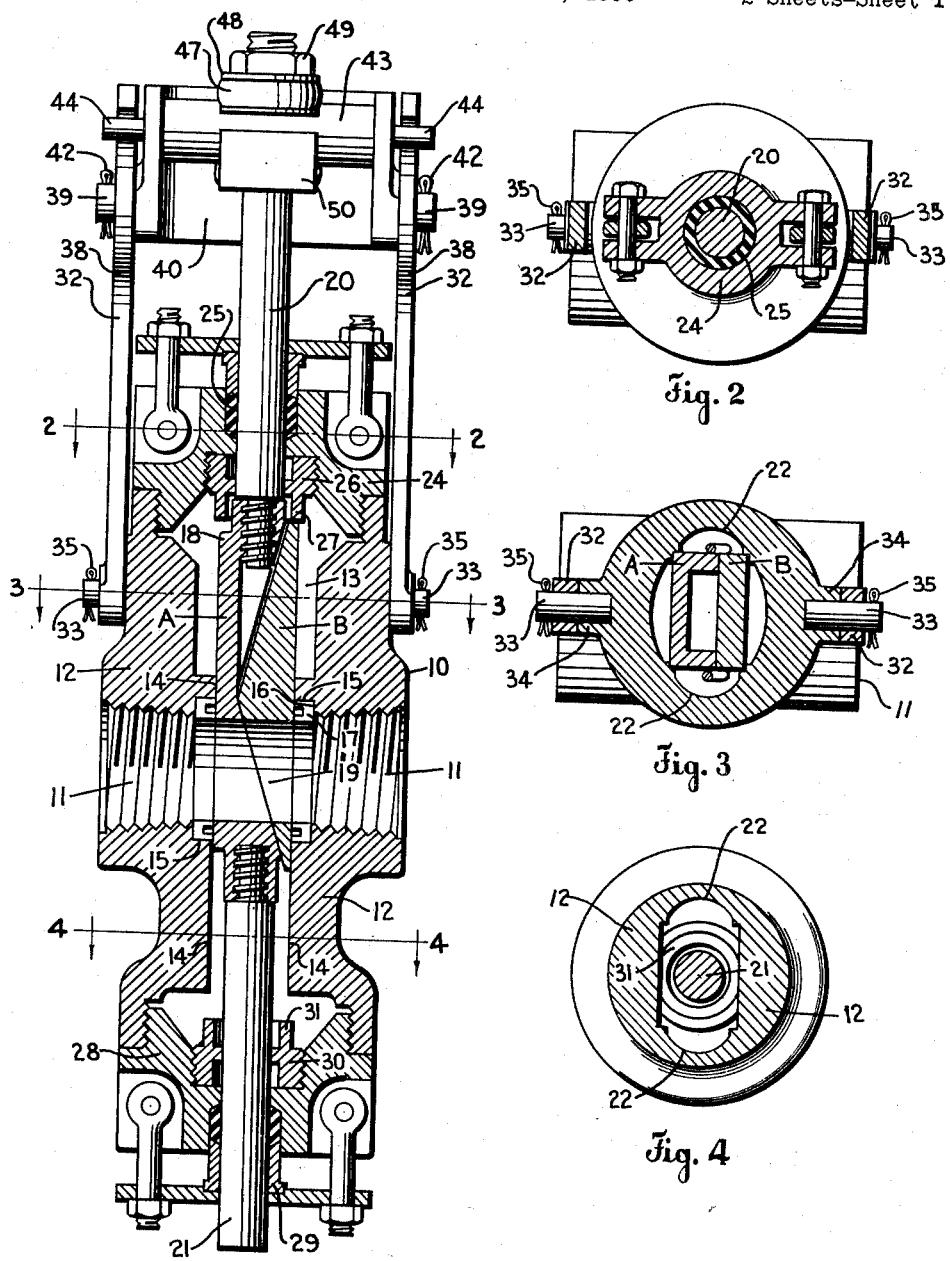

Inventor
Milton P. Laurent
By Jack Ashley
Attorney

Patented July 18, 1939

2,166,304

UNITED STATES PATENT OFFICE 2,166,304

VALVE-OPERATING MECHANISM

Milton P. Laurent, Houston, Tex., assignor to W. K. M. Company, Incorporated, Houston, Tex., a corporation of Texas Application October 20, 1936, Serial No. 106,543

3 Claims. (Cl. 251—52)

This invention relates to new and useful improvements in valve operating mechanism.

One object of the invention is to provide an improved valve operating mechanism making for rapid opening and closing of the valve.

A particular object of the invention is to provide a valve operating mechanism of the quick opening and closing type, wherein is provided improved means for positively holding the valve in either position.

Another object of the invention is to provide elastic means co-acting with the operating mechanism for bringing about a more effective locking in open and closed positions.

A further object of the invention is to provide in combination with a quick operating valve, of the rising stem type, means for guiding and balancing the valve, thus making for equalization of pressure above and below said valve, whereby actuation of the valve under high pressures is made highly efficient and more rapid.

A construction designed to carry out the invention will be hereinafter described, together with other features of the invention.

The invention will be more readily understood from a reading of the following specification and by reference to the accompanying drawings, in which an example of the invention is shown, and wherein:

Figure 1 is a vertical sectional view of a valve operating mechanism constructed in accordance with the invention, the gate being open;

Figure 2 is a horizontal cross-sectional view taken on the line 2—2 of Figure 1;

Figure 3 is a similar view taken on the line 3—3 of Figure 1;

Figure 4 is a similar view taken on the line 4—4 of Figure 1;

Figure 5:
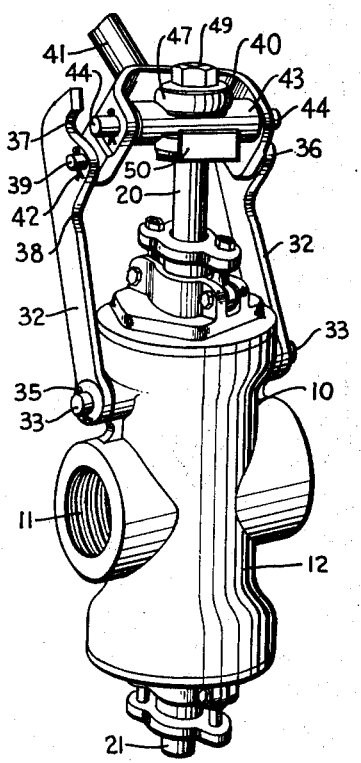
Figure 5 is a perspective of the valve shown in Figure 1, with its operating mechanism in an intermediate position.
Figure 7:
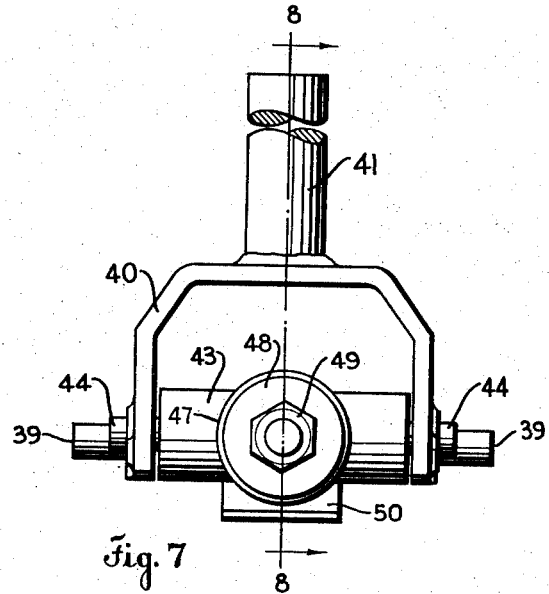
Figure 7 is a detail of the lever and stem elements.

In the drawings the numeral 10 designates a valve body or casing. While the invention may be applied to various types of valves, I have selected for the purposes of illustration, a valve of the wedge-block gate and rising stem type, similar to that shown in my Letters Patent Reissue No. 20,101.

The valve body has the usual alined flow ports 11 in its opposite walls 12 and on each side of its grease chamber 13. For a short distance above said ports, and for a considerable distance below them, opposite, approximately parallel guide faces 14 are formed on the opposite side walls of said chamber. Each port is surrounded by an annular recess 15 receiving a collar 16 having its outer flat side substantially flush with the adjacent face 14 and grooved to receive a spring-pressed sealing ring 17.

A gate block 18 having an opening 19 in its lower portion is mounted to slide vertically between the guide faces 14, in contact with the sealing rings 17, whereby the fluid flowing through the ports 11 and the opening 19 is excluded from the chamber 13. The gate includes wedge blocks A and B of the type referred to in the aforesaid Letters Patent. An actuating stem 20 rises from the block A, while a pilot or guide stem 21, depends from the lower end of the said block; the block B thus being carried by the block A and free to undergo minute independent vertical movement to spread the blocks and seal the ports. Vertical by-passes 22 along each vertical end of the gate (Figure 4) connect the upper and lower portions of the chamber 13 and permit grease or lubricant, packed in said chamber to pass around the gate when it is raised and lowered.

A bonnet 24 is screwed into the top of the body 10 and is provided with a stuffing box 25 through which the stem 20 passes. A guide bushing 26 is screwed into the under side of the bonnet, around the stem 20, and at the top of the chamber 13. This bushing has a depending flange 27, which is engaged by the upper end of the block B, whereby the latter is displaced when the gate is raised to open the valve. The stem 20 may be screwed into, or otherwise fastened to the block A.

A plug 28 similar to the bonnet 24 is screwed into the bottom of the valve body 10 and has a stuffing box 29 and a bushing 30 provided with a flange 31. The block B engages the flange upon the downward movement of the gate to wedge the blocks between the faces 14. The stem 21 slides through the plug, bushing and box. It will be seen that the stems 20 and 21 are of substantially the same diameter and the top and bottom of the gate 18, exposed substantially equal areas, therefore, pressures in the chamber 13 above and below the gate will be equalized and the gate balanced. By this arrangement substantially no resistance is offered to a quick sliding of the valve.

Figure 6:
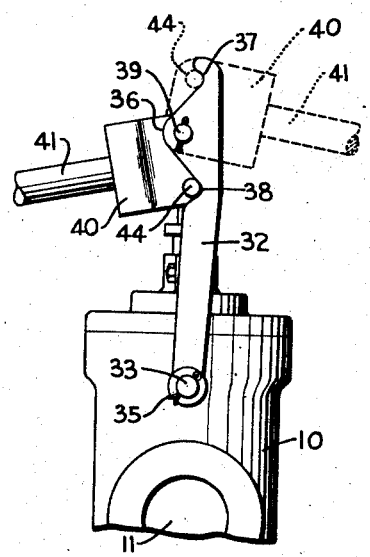
Figure 6 is a side elevation of the upper portion of the valve showing the operating mechanism in closed position in full lines and in open position in dotted lines.

For raising and lowering the stem 20, I provide an operating mechanism including a pair of swinging arms or supports 32 having their lower ends pivoted on trunnions 33, extending from bosses 34, on diametrically opposite sides of the upper portion of the valve body 10, as is best shown in Figures 5 and 6. The arms are retained by cotter keys 35. Each arm has a projection or ear 36 located between an upper notch or recess 37 and a lower notch 38, at its upper end. The ears have pivoted therein trunnions 39 extending from the lower corners (Figure 5) of a yoke 40 of a lever 41. The ears are retained on the trunnions by cotter keys 42.

Figure 8:
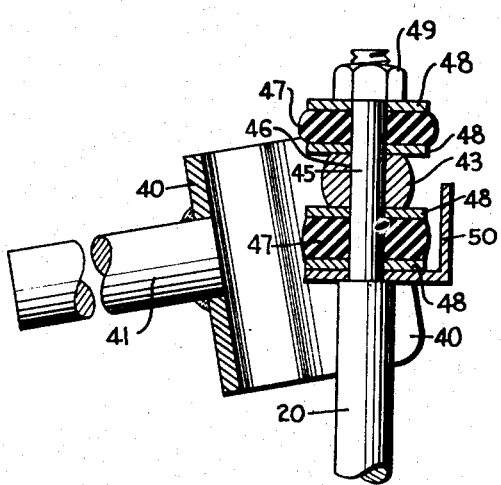
Figure 8 is a transverse sectional view taken on the line 8—8 of Figure 7.

A cross head 43 has reduced cylindrical studs 44 at its ends pivoted in the upper corners of the yoke, above the trunnions 39, Figures 1, 5, 6 and 7. When the yoke is swung on its pivots 39, the studs may be engaged in either of the notches 37 or 38, of the arms 32. The stem 20 has a reduced pin 45 at its upper end, (Figure 8) which passes through an aperture 46 in the center of the cross head. Elastic cushion rings 47, such as rubber, are confined on the pin above and below the head 43 and may be mounted between metallic washers 48. The head is preferably flattened to provide seats for the washers. The parts are held on the pin 45 by a nut 49. The cushion rings provide such elasticity as to permit the yoke 40 to continue to swing after the gate 19 has reached the end of its travel, thereby allowing the studs 44 to seat in the notches 37 and 38 on the center line or axis of the stem, whereby the gate is locked in its open and closed positions. At the upper end of the stem 20 and surrounding the reduced pin 45 is a horizontally extending lug 50 having an upstanding portion 51 on its outer end. The lug is preferably welded or secured to the stem 20, in order that it will not turn thereon and will prevent the cross head 43 rotating on the pin 45.

In operation, assuming the valve to be in the position shown in Figure 1, which is the open position, the lever 41 is swung from the position shown by the dotted lines in Figure 6 over to the position shown by the full lines in Figure 6, which moves the valve to its closed position. In moving the valve, say from its open position to its closed position, the first partial movement of the lever 41 will swing the studs 44 out of engagement with the recess 37 of the arms 32. Due to the elastic rings 47 between the metal washers 48 on the pin 45, when the studs 44 are swung out of the upper recess 37 the pressure is released on the upper ring 47 and this, combined with the moving of the trunnions 39 pass the center line of the valve body, constitutes the unlocking of the valve from its open position. The continued swinging of the lever 41 from right to left in Figure 6 will lower the gate 19 until the lever 41 and yoke 40 are swung to within a short distance of the position shown in full lines in Figure 6. Until the lever reaches this point, both of the rings 47 are compressed equally and when the lever reaches the full line position shown in Figure 6, it will be seen that the lower elastic ring 47 is compressed and the upper ring is expanded and is allowed to resume its natural shape just the reverse of the showing in Figure 8 for the open position of the valve. In this position the trunnion 39 is again swung past the center line of the valve and the studs 44 (Figure 6).

Attention is called to the fact that although the valve has been shown and described as having a pilot stem 21 on the lower end of the gate 19, this stem is not always essential, because in some instances this stem will not be required. This is particularly true of valves used for handling low pressure fluid. In certain installations, such as the handling of low pressure fluid, the quick opening feature will actuate just as satisfactorily without the stem as it will with the stem. Obviously, if the stem is not required in the operation of the invention, it is not necessary to use the same.

What I claim and desire to secure by Letters Patent is:

1. A valve operating mechanism including in combination, a casing and a stem longitudinally reciprocative in the casing, said stem projected outside the casing and limited in stroke, a cross-head mounted on said stem to move longitudinally thereof, opposed elastic members on the stem on opposite sides of the cross-head and normally equalized to support the cross-head neutrally therebetween, and toggle means connected to the casing and said cross-head for moving the stem in either longitudinal direction whereby said elastic members are alternately compressed to hold the stem in either of its operated positions and the toggle means releasably locked in its operated condition.

2. The combination of a casing and a reciprocatory valve stem having limited stroke in each direction, and means for actuating and holding said stem in operated position in either direction, said means including a cross-head mounted on said stem to move longitudinally thereof, elastic members sleeved on said stem on opposite sides of said cross-head, said elastic members being normally of equalized effect to support the cross-head neutrally therebetween and alternately individually compressible by movement of the cross-head thereagainst after the stem is arrested in its longitudinal movement in either direction, said cross-head having studs at its ends, an operating lever having a yoke extension pivoted on the studs of said cross-head and the studs projecting beyond the sides of the yoke, and a pair of supporting links pivoted at one end on the casing on opposite sides of the stem, the pivotal axes of said links and the axes of said studs of the cross-head being in a plane parallel with that of the axis of the stem, said links being pivotally attached near their opposite ends to the yoke extension of said operating lever and having marginal recesses on opposite sides of the pivotal attachment to the yoke so as to receive the projected studs of the cross-head and thereby place the pivotal axes of the links and yoke extension beyond dead center whereby to releasably lock the stem actuating means in operated position and hold the stem at its stroke limit by the reaction of the elastic member on the stem as compressed by the cross-head moved thereagainst.

3. The herein described operating and holding means for reciprocatory valve stems having limited travel in each direction, including cooperating toggle elements pivotally attached to the valve casing and having a longitudinally movable pivotal attachment to the stem with interposed elastic members resisting the longitudinal movement in either direction, said toggle elements being stopped in operated condition beyond dead center after each operation of the stem and the elastic members being alternately compressed according to direction of travel after arrest of the stem movement, whereby the toggle elements are releasably locked in operated condition and the stem held at the end of its stroke.

MILTON P. LAURENT.